United States Patent [19]

Stone

[11] Patent Number: 4,777,064
[45] Date of Patent: Oct. 11, 1988

[54] METHOD OF REDUCING PENETRATION OF PAVING GRADE ASPHALTS AND APPLYING THE PRODUCT TO A GRANULAR MATERIAL

[76] Inventor: Eugene M. Stone, 1105 Glencoe St., Denver, Colo. 80220

[21] Appl. No.: 56,667

[22] Filed: Jun. 2, 1987

[51] Int. Cl.⁴ ............................ B05D 5/10; E01C 5/12
[52] U.S. Cl. ................................. 427/138; 106/273 R; 208/23; 404/75; 427/372.2
[58] Field of Search ...................... 106/273 R; 208/23; 427/138, 372.2; 404/75, 77

[56] References Cited

U.S. PATENT DOCUMENTS

| | | | |
|---|---|---|---|
| 2,308,245 | 1/1943 | Ortunsky | 208/23 |
| 2,658,026 | 11/1953 | Maclaren et al. | 106/273 R |
| 3,216,336 | 11/1965 | Benson | 427/138 |
| 3,399,608 | 9/1968 | Benson | 404/76 |
| 3,418,249 | 12/1968 | Pitchford | 208/23 |
| 3,793,189 | 2/1974 | Corbett | 208/23 |
| 3,919,148 | 11/1975 | Winters et al. | 427/138 |
| 3,986,887 | 10/1976 | Pitchford | 106/273 R |
| 4,268,318 | 5/1981 | Stone | 106/277 |
| 4,283,231 | 8/1981 | Clementoni et al. | 427/138 |
| 4,373,961 | 2/1983 | Stone | 106/281 R |

Primary Examiner—Sadie L. Childs
Attorney, Agent, or Firm—Cushman, Darby & Cushman

[57] ABSTRACT

A first method for reducing the penetration of paving grade asphalts. Paving grade asphalt is blended with a solvent extracted resin-asphaltene residuum in the proportions of approximately 75% to 25% by weight, respectively, to yield penetration of 25 or less of the resulting mixture.

A second method of applying the reduced penetration asphaltic product mixture, obtained by the first method, to a granular surface. The asphaltic mixture is first diluted with an evaporative diluent and then spread over a granular surface so as to penetrate into and stabilize the underlying granular material.

8 Claims, No Drawings

METHOD OF REDUCING PENETRATION OF PAVING GRADE ASPHALTS AND APPLYING THE PRODUCT TO A GRANULAR MATERIAL

BACKGROUND OF THE INVENTION

This is a process and method by which a paving grade asphalt material, having normal penetration of from 40 to 300, may be reduced without sacrifice of other significant properties, to less than 25 penetration by the proportioning and blending of a very hard, high softening point, solvent extracted resin-asphaltene residuum The proportioning and blending is accomplished without use of further refining processes, i.e., using steam, vacuum or solvent refining. The proportioned and blended product may then be diluted with evaporative petroleum solvents to produce a penetrative binder suitable for the stabilization of pavement surface layers.

On Nov. 9, 1965, U.S. Pat. No. 3,216,336 was granted to J.R. Benson on "ASPHALT PENETRATIVE GROUND STABILIZER", hereinafter referred to as "BENSON PATENT". The invention related to soil stabilizing by use of an asphaltic binder mixture. The mixture made use of a selected, single, hard asphalt, resulting from the propane extraction process used in oil refining. However, the sources of suitable hard asphalt were discovered to be somewhat limited. This suitable asphaltic material could also be used to improve the quality of regular paving asphalt cements for which there was greater demand. As a result, the ASPHALT PENETRATIVE GROUND STABILIZER, covered by the "Benson Patent", never obtained wide general acceptance in the United States.

Further, due to the crude oil shortages that occurred in the early 1970's in the United States, and the necessity of producing maximum energy products and lubricating oils from the available crude oils, many oil refineries in the United States, stopped producing not only soft normal asphalt of 40 to 300 penetration, but also the 3 to 25 penetration asphalts required for use with the Benson patent. Instead, new more efficient solvent refining methods were accepted, by which even greater proportions of lubricating oils were extracted from the crude oil, from which only extremely hard or even dry powderous residues were obtained, very different from the original solvent extracted 3 to 25 penetration described by Benson. With the new (liquid separation of oil and residuum versus the previous liquid separation processes) more efficient systems, production and availability of the original 3 to 25 penetration, low softening point solvent extracted asphalts became less and less available. As a result, the use of the Benson material (marketed under the trademark "Peneprime") diminished to the point of non-use and relinquishment of the trademark "Peneprime".

An important part of the Benson Patent related to the character of the hard base asphalt. Previous attempts to utilize hard asphalt materials (within 3 to 25 penetration range) were unsuccessful, due to brittleness of the treated surfaces. Rapid breakup and ravelling occurred under exposed traffic. The asphalts produced in these trials were usually air-blown asphalts, asphalts where consistency (penetration) had been reduced from soft asphalts (50 penetration and above) by heating and blowing with air. While the treatment succeeded in obtaining hard asphalts, such asphalts had high softening points and very low normal ductilities. Benson discovered, however, that when soft asphalts and distillation residuals were hardened by a propane extraction process, the asphalts so produced not only had desired penetration (in the 3 to 25 range) but these asphalts also had low softening points. Benson ascribed his successful use of such materials, in a penetrative binder, to the properties of low penetration and low softening points. In only one known case (due to the peculiarity of the crude oil from which the soft asphalt was produced) could a soft asphalt be reduced by blowing with air at high temperatures, to below 25 penetration, while still retaining low softening point. All other known materials were propane extracted. Benson further patented (U.S. Pat. No. 3,399,608 - granted Sept. 3, 1968) an emulsion which also could be successfully used as a cementing binder, consisting of the hard base (solvent extracted hard asphalt) and a small quantity of suitable distillates. In still later developments (U.S. Pat. Nos. 4,268,318—granted May 19, 1981 and 4,373,961—granted Feb. 15, 1983 both to Stone) a blend of soft asphalt and a hard solvent extracted asphalt was invented, having penetrations below 50, a high ductility, and low softening points.

Prior to discontinuing the use of the Benson penetrative binder, a number of schemes were "improvised" to produce satisfactory basic asphalt to meet the requirements of the Benson discoveries. Straight reduction of soft asphalts to penetrations below 25, by use of high temperatures and steam, proved to be impractical. The cost of the required equipment for such operation could not be justified. It was apparent that in order to obtain an asphaltic material equal to the propane extracted asphalts generally used under Benson's patent, a simple process utilizing locally and immediately available normal paving grades asphalts had to be developed. Also, it was essential that such asphalts be economically reduced to penetrations below 25, while retaining high ductilities and low softening points. Further, it was apparent that all necessary components of an asphaltic material meeting the requirements of the Benson Patent must be readily and economically available in all parts of the United States, using simple, low-cost equipment.

During recent years, new oil refining processes have been developed. One of these processes is the ROSE process (Residuum Oil Supercritical Extraction) developed by Kerr-McGee Corporation Another, a similar process, has been engineered by Universal Oil Products (U.O.P.), INC. for Diamond Shamrock Refining and Marketing Company at its oil refinery at Three Rivers Texas. All of these oil refineries produce a resin-asphaltene residuum that is very hard. The penetration is zero at 77° F., with a softening point above 175° F. In some instances, due to these and other undesirable characteristics, including such materials as ash and various metals which make the residuum frequently unacceptable for blending into normal paving grade asphalt, the residuum is sometimes regarded as a "waste" product, even having negative value with the product makketed at substantially less than normal paving grades asphalt prices. However, it has been found that such resin-asphaltene residuum may be proportioned and blended with normal paving grades asphalt (40 to 300 penetration—hereinafter called "Normal paving grades asphalt"), the resultant asphalt being proportioned to give minus 25 penetration. This material exhibits good ductility and softening points, characteristics suitable for the purpose of stabilizing absorptive granular materials.

In this use, the ash and metals in the resin-asphaltene residuum pose no problem since they are completely encapsulated in the absorbed cured material in the road surface.

Whereas only propane extracted asphalt or similar products were usable under the Benson Patent, the present invention's composite product, which uses a minor part of such residuum and a major part of normal paving grades of asphalt, results in a suitable product for all of the purposes set forth in the Benson Patent. The usual proportions of residuum and diluent are less than one-third residuum and more than two-thirds normal paving grades of asphalts. Since normal paving grades of asphalts are universally available throughout the United States, it is now possible by use of these residuums, to economically produce an asphalt cement for stabilizing of highway and road building surfaces of soil and aggregates (sand and gravel). Roadway driving surfaces can be produced at one-half the cost or less of normal asphalt pavements. In addition, the new stabilizer product can be produced without expensive and complicated refining equipment. It can be produced by simple processes of blending, involving only low-cost equipment and operated by personnel having very limited technical training. The blending process consists essentially of heating the normal paving grades asphalts to temperatures of 300° F. and above, proportioning, injecting or adding molten (liquid) or dry residuum until the penetration of the resultant blend is below 25 penetration. The resultant product is blended with a naptha-kerosene solvent as used in the Benson stabilization process. The napthakerosene solvent may be added to the normal paving grades asphalt before or after the injection of the residuum.

The end product, a blend of normal paving grades asphalts and residuum, diluted with solvent sufficient to make a fluid blend at ambient temperature, penetrates well into earthen or slightly porous highway, road or other surface. The resultant product then cures into a hard, durable surface as described in the Benson Patent. The process of blending the composite asphalt, as described above results in an increase in the polar activity of the resultant composite micelle, permitting a more complete penetration and bonding into the highway, road or other surfaces.

Whereas normal paving grades asphalts have a substantial percentage of oily constituents, including malthenes, the resin-asphaltene residuum is essentially an asphalt residue from which nearly all oily constituents and much of the resins have been extracted. The remaining material consists of a micelle, comprising a carbonaceous core encompassed in a hard resinous material. The micellian structure of the original asphalt is thereby retained. Electrical resistivity tests indicate the retention of the resinous material since the carbonaceous core material in the center of the micelle is more or less conductive. It is this fact that accounts for the ability of the residue to disperse and dissolve in the basic asphalt. By blending these products in the disclosed proportions, the resultant mixture has a larger percentage of asphaltenes and hence greater cementing and load bearing capacities than normal paving grades asphalts. Such characteristics provide longer life roadway surfaces with greater resistance to weathering.

The unexpected results and advantages of blending composite asphalts from residuums and normal paving grades asphalts according to the present invention are as follows:

1. The resin-asphaltene residuum is soluble in, and easily dispersed into, regular paving asphalts.

2. The blend is congenial, with no significant separation.

3. Penetration of less than 25 can be obtained.

4. The composite of residuum and normal paving grades asphalts has an equal or greater ductility than normal paving grades asphalts.

5. The composite blend can be diluted with a naptha-kerosene blend without precipitation of asphaltenes.

6. The composite asphalt, when diluted with a naptha-kerosene blend, readily penetrates earthen highway, road and other surfaces, to depths equal to or greater than the diluted propane extracted asphalt as covered by the Benson patent.

7. The treated granular material hardens and cures into a surface suitable for traffic with good durability (due to high ductility), and has weathering characteristics superior to previously used propane extracted asphalts.

8. The resin-asphaltene residuum can be moderately diluted with kerosene or the like and shipped in tank cars to distant locations, thereafter being diluted to required viscosities.

9. The residuums can also be shipped in containers similar to conventional shipment of roofing asphalts. It can then be melted, blended into a composite, and further blended with the required solvent to the required viscosities.

In the present invention, a process has been discovered which produces a material with the desired properties for use as a penetrative binder. Wide availability of residuum, from ROSE and U. O. P., locally available paving grade asphalts, and simple low-cost processing equipment now permits products equal to or better than the previously available propane extracted asphalts used by Benson.

DESCRIPTION OF THE PREFERRED EMBODIMENT

As used herein, the following test methods and terms shall be applicable:

1. The term "PENETRATION" as used herein, in relation to the hardness of an asphaltic material, shall be determined by ASTM Standard Designation D5-83 100 g, 77° F., 5 sec. However, this designation shall not be applicable to the term "PENETRATION" and "PENETRATIVE" when used in relation to the depth of penetration of a liquid into a surface.

2. DUCTILITY shall be determined by ASTM Standard Designation D 113-79.

3. SOFTENING POINT shall be determined by ASTM Standard Designation D-36-86 (Ring and Ball Method).

4. BENSON PATENT shall refer to U.S. Pat. No. 3,216,336 granted to J.R. Benson on Nov. 9, 1965, for "ASPHALT PENETRATIVE STABILIZER".

5. RESIDUUM shall refer to the resin-asphaltene solvent extracted residue from the ROSE (Residuum Oil Supercritical Extraction) process, developed by Kerr McGee Corporation and the U. O. P. process engineered by U. O. P., Inc. and similar solvent extraction processes having penetration of zero to a minimum of approximately 120° F. and a softening point of approximately 200° F.

6. STABILIZATION and STABILIZING is the act of making a surface or body resistant to water, wind and wear effects.

Published information as to the character of the solvent extracted residuum obtained by the ROSE process and the similar U. O. P. developed process, indicates that the residuum contains various amounts of sulphur, minerals and metals, depending on the crude oil source and refinery operating criteria. The product is very hard and brittle and may be powdery, flaky or chunky. This would be very low in oily onstitutents (only very heavy ends) and low in resin content. The highly carbonaceous asphaltene (petroleum ether insoluble) portion of the residuum is normally very high. The total hydrogen content is low. An analysis of one residuum, a product of the U. O. P. process, is as follows:

| | |
|---|---|
| Softening Point | 270–310° F. |
| Molecular Weight | 3200 |
| Carbenes | 0.54% |
| Asphaltenes | 68.2% |
| Resins | 5.6% |
| Oily Constuents | 26.7% |
| Mineral Matter | .57% |
| Total Carbon | 84% |
| Hydrogen | 8.5% |
| Flash Point | 635° F. |
| Penetration at 135° F. | 0 |
| Penetration at 150° F. | 5 |

Residuums from both processes, while having a zero penetration at 77° F., have penetrations, by the same test, at 150° F. of about 5. At ambient temperature such residuums can be crushed into powder or be liquified at normal temperatures of 300° to 400° F. (at softening points of 270°–310° F., liquification must be well above 300° F.) Although the residuums are high in sulphur and contain contaminates, these contaminates do not prohibit use of such material in combination with normal paving grades asphalts to obtain a satisfactory minus 25 penetration base stock. In use as a penetrative binder all contaminates are closely bound in the composite hardened asphalt and thus present no adverse effects.

The blending process involves simply heating the paving grade asphalt to a temperature above 300° F., adding residuum in either a dry solid state, or a molten state and agitating or mixing until the mixture penetration is below 25. The mixture is then further diluted with a naptha-kerosene or similar solvent (to a Saybolt Furol viscosity at 122° F. of less than 100 seconds) for application to highway surfaces as a penetrative binder.

The simple equipment requirements for blending residuum and paving asphalts have been noted. The equipment would require only such tanks, pumps, and heating equipment as may easily be portable for field and site operations. The residuum may be shipped in a molten condition at temperatures of approximately 400° F. (in insulated tank cars or trucks) in which state, it may be blended with heated liquid asphalt (shipped hot or heated by convential retort circulating asphalt heaters), then either tank or pipe - blended with evaporative (normally kerosene-naphtha blend petroleum) solvent.

The residuum may also be partially blended with sufficient evaporative solvent as to make the material sufficiently fluid at temperatures appreciably below the 400° F. temperature required for the raw residuum, as to make shipping and blending easier at the point of blending.

Since the paving asphalts are almost universally available, the residuum may also be shipped in the solid form to the site of blending or use. In such form, it has been found to be most convenient to effect partial solution of the residuum in the evaporable solvent by mild heating and agitation, prior to adding to the paving asphalt. The various means of shipping and blending are adaptable to the varied sources of materials and the locations of use of the penetrative binder, to obtain the most economical procedures.

EXAMPLES AND TESTS

EXAMPLE NO. 1

Using an A.C.-10 asphalt cement, with penetration of 79 and ductility of 121, 25% by weight, of ROSE process residuum from the ROSE unit at the Derby Oil Refinery at El Dorado, Kansas was blended into the AC-10 asphalt cement.

The results were:
Penetration: 12
Ductility: 136
Softening Point: 140° F.

EXAMPLE NO. 2

Using an A.C.-10 asphalt cement with penetration of 79 and ductility of 121, 20% by weight, of U. O. P., Inc. process residuum from the U. O. P., Inc. unit at the Diamond Shamrock Refining and Marketing Company Oil Refinery at Three River, Texas was blended into the A.C.-10 asphalt cement.

The results were:
Penetration: 16
Ductility: 150+
Softening Point: 140° F.

EXAMPLE NO. 3

Using an A.C.-10 asphalt cement with penetration of 79 and ductility of 121 17% by weight, of U. O. P., Inc. process residue from the U. O. P., Inc. unit at Diamond Shamrock Refining and Marketing Company Oil Refinery at Three Rivers, Texas was blended into the A.C.-10 asphalt cement.

The results were:
Penetration: 19
Ductility: 150+
Softening Point: 132° F.

In all of these examples, the penetration was reduced below 25, indicating increased load bearing strength. The ductility was increased, indicating liveliness and longer life, and the softening point was below 160° F., indicating no significant brittleness.

Once the reduced penetration blend is obtained, the blend may be further blended with kerosene, or another equivalent evaporative solvent (to a Saybolt Furol viscosity at 122° F. of less than 100 seconds), and used in the Benson surface treatment process. The Benson process consisted essentially of evenly spreading the kerosene blended low penetration asphalt on the absorbtive granular surface which is to be stabilized. Treatment rates, i.e., gallons per square yard of surface, depend entirely on the absorptive nature of the granular material and the depth of penetration desired. Further considerations include the eventual use of the surface, i.e., light or heavy vehicle traffic, nature of the traffic (trucks or cars), and expected axle loads. As a result, treatment rates can vary from 0.5 gallons/square yard to as much as 1.5 gallons/square yard.

I claim:

1. A method of reducing the penetration at 77° F. of paving grade asphalt to less than 25, said method comprising the step of:

blending paving grade asphalt having a penetration at 77° F. in the range of 40 to 300 with a hard solvent extracted resin-asphaltene residuum, having a penetration of zero to a minimum of approximately 120° F. and a softening point in excess of approximately 200° F. in the approximate proportions of 75% by weight paving asphalt to 25% by weight of resinasphaltene residuum.

2. A method of reducing the penetration of paving grade asphalt as described in claim 1 wherein;
said resin-asphaltene residuum is further characterized by a flash point in excess of approximately 600° F.

3. A method of reducing the penetration at 77° F. of paving grade asphalt as described in claim 1 further comprising;
heating said paving grade asphalt to a temperature above 300° F., proportioning, blending, mixing and adding said residuum in a molten state and blending the resultant mixture until the blend penetration is below 25.

4. A method of reducing the penetration of paving grade asphalt as described in claim 1 further comprising;
heating said paving grade asphalt to a temperature above 300° F., proportioning, blending, mixing and adding said residuum in a dry state and blending the resultant mixture until the blended penetration is below 25.

5. A method of reducing the penetration of paving grade asphalt as described in claim 1 wherein;
said residuum is further characterized by a resin content of not less than 3% of said residuum.

6. A method of making a stable surface out of an absorptive soil or granular material comprising the steps of:
(a) spreading a fluid penetrative binder having a penetration of less than 25 at 77° F. and consisting essentially of a hard resin-asphaltene residuum blended with a paving grade asphalt having a penetration in the range of 40–300 at 77° F., further blended with an evaporative diluent such as kerosene, over said soil or granular material,
said residuum being characterized by a penetration of zero to a minimum of approximately 120° F. with a softening point in excess of approximately 200° F.
said penetrative binder being diluted with evaporative diluent to result in a Saybolt Furol viscosity at 122° F. of less than 100 seconds;
(b) allowing substantially all of said evaporative diluent to evaporate so that the residual binder components of resin-asphaltene residuum and paving asphalt retained in the absorptive soil or granular material form a stable surface.

7. A method of stabilizing a surface as described in claim 6 wherein;
said resin-asphaltene residuum is further characterized by having an asphaltene content, said asphaltene being insoluble in petroleum ether, in excess of 55% thereof.

8. A method of stabilizing a surface as described in claim 7 further comprising:
(a) heating said paving grade asphalt to liquidation, proportioning, blending, mixing and adding resin-asphaltene residuum in a molten state with the resultant blend having a penetration of 25 or less.

* * * * *